United States Patent
Dixit et al.

(10) Patent No.: US 10,573,057 B1
(45) Date of Patent: Feb. 25, 2020

(54) TWO-PART CONTEXT-BASED RENDERING SOLUTION FOR HIGH-FIDELITY AUGMENTED REALITY IN VIRTUALIZED ENVIRONMENT

(71) Applicant: Citrix Systems, Inc., Fort Lauderdale, FL (US)

(72) Inventors: Pawan Kumar Dixit, Bangalore (IN); Mudit Mehrotra, Bangalore (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 16/122,461

(22) Filed: Sep. 5, 2018

(51) Int. Cl.
   *G06T 15/04* (2011.01)
   *G06T 19/00* (2011.01)
   *G06T 7/70* (2017.01)
   *G06F 16/33* (2019.01)
   *G06F 3/14* (2006.01)
   *G06F 3/0346* (2013.01)
   *G05D 1/02* (2006.01)
   *G06F 16/335* (2019.01)

(52) U.S. Cl.
   CPC .......... *G06T 15/04* (2013.01); *G05D 1/0234* (2013.01); *G06F 3/0346* (2013.01); *G06F 16/335* (2019.01); *G06T 7/70* (2017.01); *G06T 19/006* (2013.01)

(58) Field of Classification Search
   CPC combination set(s) only.
   See application file for complete search history.

(56) References Cited

U.S. PATENT DOCUMENTS

| | | | | |
|---|---|---|---|---|
| 2008/0301566 | A1* | 12/2008 | Abdo | G06F 9/452 715/748 |
| 2010/0194753 | A1* | 8/2010 | Robotham | G06F 3/14 345/428 |
| 2015/0070347 | A1* | 3/2015 | Hofmann | G06K 9/00208 345/419 |
| 2017/0087465 | A1* | 3/2017 | Lyons | G07F 17/3211 |

FOREIGN PATENT DOCUMENTS

WO   WO-2012007764 A1 *  1/2012  ............. H04L 67/38

* cited by examiner

Primary Examiner — Wesner Sajous
(74) Attorney, Agent, or Firm — Fox Rothschild LLP; Robert J. Sacco; Carol E. Thorstad-Forsyth

(57) ABSTRACT

Systems and methods for rendering an Augmented Reality ("AR") object. The methods comprise: drawing a first bitmap of a first AR object rendered by a server on a display of a client device; selecting/focusing on a second AR object or a part of the first AR object shown on the display; communicating a request for the second AR object or the part of the first AR object from the client device to the server; obtaining, by the server, an object file for the second AR object or part of the first AR object; providing the object file to the client device; locally rendering, by the client device, the second AR object or part of the first AR object as a second bitmap; superimposing the second bitmap on the first bitmap to generate a third bitmap; and drawing the third bitmap on the display of the client device.

26 Claims, 7 Drawing Sheets

TWO-PART CONTEXT-BASED RENDERING SOLUTION FOR HIGH-FIDELITY AUGMENTED REALITY IN VIRTUALIZED ENVIRONMENT

BACKGROUND

Statement of the Technical Field

The present disclosure relates generally to computing systems. More particularly, the present disclosure relates to implementing systems and methods for providing a two-part context based rendering solution for high fidelity augmented reality in a virtualized environment.

Description of the Related Art

Augmented Reality ("AR") is a technology that superimposes a computer-generated image on a user's view of the real world, thus providing a composite view. Accordingly, AR software applications show virtual objects on top of a real world scene while looking through a camera or transparent display. The AR software applications essentially draw bitmaps on top of the camera's view and move those bitmaps according to camera's motion so as to create an illusion of a virtual object present at a location in the real world. This is generally done using Simultaneous Localization And Mapping ("SLAM") to build a map of reliable feature points and continuously tracking the feature points so the virtual object can be placed at a certain location in the real world.

An AR software application actually contains a model of the virtual object. When the AR software application requests a virtual object to be shown in the real world, this model of the virtual object is rendered locally on the client device, and rendered bitmaps are painted on top of the camera's view. This causes limitation to the AR experience. For example, the model of the AR software application is not scalable because all the Hi-Fidelity 3D models related to an AR experience have to reside on the client storage at the same time. The model of the AR software application is quite heavy on the client side because all models are rendered on a General Processing Unit ("GPU") or Central Processing Unit ("CPU") of the client device. The management of the virtual models/images/animations becomes a tedious task because the same reside in each and every client device. AR objects may be of sensitive nature for a company, and therefore may only be shown when certain conditions are met and with proper authorization. A brute-force virtualization by moving an AR software application and model to the server-side would result in an inferior and laggy experience for the end user.

SUMMARY

The present disclosure concerns implementing systems and methods for rendering an AR object. The methods comprise: drawing a first bitmap of a first AR object rendered by a server on a display of a client device; selecting or focusing on a second AR object or a part of the first AR object shown on the display of the client device; communicating a request for the second AR object or the part of the first AR object from the client device to the server; obtaining, by the server, an object file for the second AR object or part of the first AR object; providing the object file to the client device; rendering, by the client device, the second AR object or part of the first AR object as a second bitmap using a local rendering engine; superimposing the second bitmap on the first bitmap to generate a third bitmap; and drawing the third bitmap on the display of the client device.

In some scenarios, the methods also comprise performing operations by the client device to discover a beacon, obtain credentials from the beacon, and use the beacon's credential to login to the server for accessing AR content. The credentials for the client device and/or user may also be used to login to the server. The server generates a sub-catalog of markers and AR objects based on certain criteria when the client device logs in. The certain criteria includes, but is not limited to, a time, a user identifier, a location, an internet connection type, a device type, manually entered filter criteria, and/or other contextual information relating to the client device's operation and/or use.

In those or other scenarios, the methods further comprise: searching the sub-catalog for the first AR object; rendering the first AR object as the first bitmap remotely at the server; and providing the first bitmap to the client device.

In those or yet other scenarios, the methods involve: detecting at least one of (A) rotation, change in orientation or movement of the client device and (B) rotation, movement, change in scale, or change in zoom level associate with the first AR object; sending to the server a message with at least one of a new orientation value, a new scale value, a Simultaneous Localization And Mapping ("SLAM") data point, a new distance for a camera to an anchor point, a data point related to the client device's operation or use, and a new distance of the client device to an anchor point; updating at least one of an orientation of a virtual camera or a distance of the virtual camera to the anchor point based on contents of the message; rendering by the server the first AR object as an updated first bitmap with the virtual camera; sending the updated first bitmap to the client device; and/or drawing the updated first bitmap on a display of a client device.

The methods may also involve: re-rendering, locally by the client device, the second AR object or part of the first AR object as the second bitmap based on at least one of (A) a rotation, a change in orientation, or movement of the client device and (B) a rotation, a movement, a change in zoom level or a change in scale of the first AR object; superimposing the second bitmap on the first bitmap to update the third bitmap; and drawing the third bitmap on the display of the client device. Additionally or alternatively, operations can be performed to limit which parts of the first AR object may be rendered based on at least one of who is using the client device and the client device's location.

The present solution also concerns systems and methods for rendering an AR object. The methods comprise: drawing, by a client device, a bitmap for the AR object received from a server on a display; and detecting when (A) the client device is rotated or moved, (B) the AR object is rotated or moved relative to an anchor point, (C) the AR object is zoomed in/out on, or (D) the AR object's scale is modified. In response to a detection of at least one of (A), (B), (C) and (D), communicating a message from the client device to the server, where the message comprises a new orientation value, a new scale value, a Simultaneous Localization And Mapping ("SLAM") data point, a new distance of a camera to an anchor point, and/or a data point related to the client device's operation or use. The server: updates at least one of an orientation of a virtual camera, a scope of the virtual camera, and a distance of the virtual camera to an anchor point in accordance with contents of the message; and renders the AR object as a bitmap using the virtual camera with the updated orientation, scope or distance. The client device draws the bitmap on the display.

BRIEF DESCRIPTION OF THE DRAWINGS

The present solution will be described with reference to the following drawing figures, in which like numerals represent like items throughout the figures.

DETAILED DESCRIPTION

Figure 1:
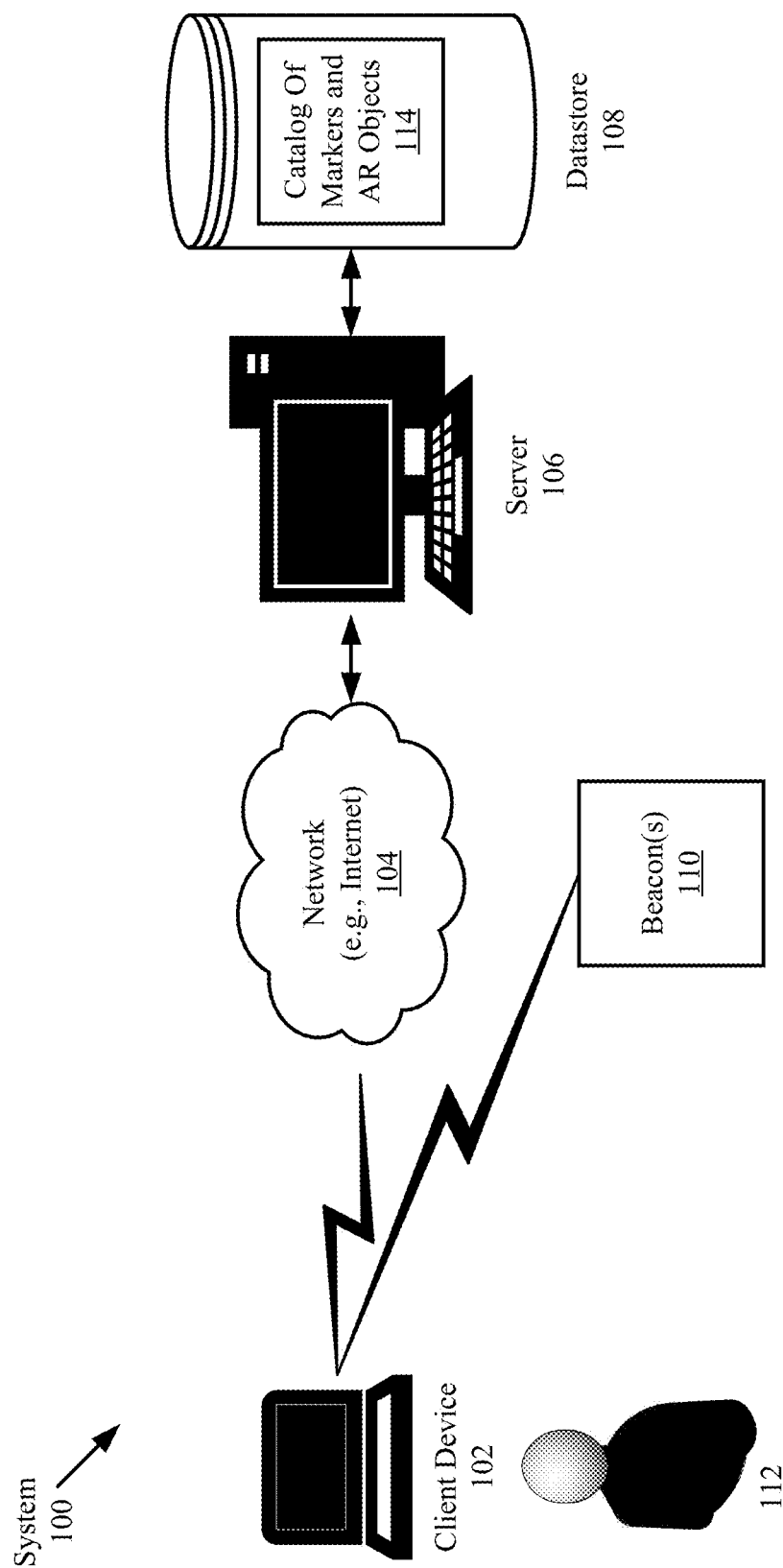
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution concerns systems and methods for providing a two-part context based rendering solution for high fidelity AR in a virtualized environment. As noted above, AR is a technology that superimposes a computer-generated image on a user's view of the real world, this providing a composite view. The terms render and rendering refer to an automatic process of generating a 2D or 3D image of an object on a computer from a model by means of application programs, as should be known. The solution can be used in virtualize AR software applications. The computationally expensive rendering of AR objects happens on a server and rendered bitmaps are sent to a client device (or other end node) for display. As should be known, a bitmap is a map of bits in which each item corresponds to one or more bits of information, especially the information used to control the display of a computer screen. At the same time, an AR application running on the client device is able to leverage Simultaneous Localization And Mapping ("SLAM") using sensing on the client device (e.g., ambient lighting sensor data, accelerometer sensor data, camera data, etc.). SLAM is well known in the art, and generally refers to the process of constructing or updating a map of an unknown environment while simultaneously keeping track of the agent's location within it. Also, the client device can receive a part of the AR object from the server, render the AR object part locally, and paint a bitmap image of the AR object part on top of an AR bitmap projection being received from the server for high fidelity and fluidity when working on that particular AR object part. Also, the AR content is rendered to a client device based on context from a user as well as one or more location-based beacons.

The present solution has many novel features. In this regard, it should be understood that the present solution supports sensing on the client device and the server's AR engine. An AR application is divided into two parts: a first part running on the client device that performs SLAM; and a second part (rendering engine) that renders the AR object as one or more bitmaps on the server. The server sends rendered bitmaps to the client device. The client device then draws received bitmaps by using the anchor points identified by client device. An anchor point is a location of a marker in the real world. For example, a XenApp or XenDesktop may be used as a server with the rendering engine. A Citrix receiver launches the rendering engine as a virtualized application that talks to a SLAM engine running as a local application on the client device. The present solution is not limited to the particulars of this example.

The present solution also supports a local-like, fluid AR experience by rendering a sub-part of the virtual object on the client device. Two copies of a rendering engine application are provided. A first copy of the rendering engine is published as a virtual application on the server. A second copy of the rendering engine runs locally on the client device. Depending on the desired fidelity and fluidity requirement, a sub-part of the virtual object (or AR model) may be fetched as an object file on the client device and rendered locally using the second copy of the rendering engine. The bitmap of the sub-part of the virtual object will then be superimposed on the bitmap of the complete AR model, which was rendered at the server by the first copy of the rendering engine. So in this way, even when the fidelity and fluidity of the complete AR model bitmap may not be very high in low-bandwidth conditions, the focused subpart will have higher fidelity and fluidity of interaction (move around the model, move closer to the model, etc.) as it was rendered locally and there is no delay in interaction.

The present solution further supports policy-controlled AR content rendering. Depending on who is logged-in and the person's location (determined through a location-based beacon), only a selective part of the AR model/content may be rendered.

Illustrative System

Referring now to FIG. 1, there is provided an illustration of an illustrative system 100 implementing the present solution. The present solution solves the above stated problems with conventional AR systems by implementing a two-part context based rendering process for virtualize AR software applications. Server-side rendering is used for the whole AR object, while client-side rendering is used for a part of the AR object that is selected by a user to be in focus. An AR object catalog is filtered on the server-side to obtain a sub-catalog of available AR content available to the client based on certain criteria. This criteria can include, but is not limited to, time, a user identifier, a location, an internet connection type or other contextual information relating to the client device's operation and/or use.

As shown in FIG. 1, system 100 comprises a client device 102, a network 104 (e.g., the Internet), a server 106 and a datastore 108. The server 106 has access to a catalog of markers and AR objects 114 stored in the datastore 108. Markers are well known in the art, and each comprises a feature point in a real world scene. The feature point includes, but is not limited to, a barcode (e.g., a QR code), a landmark or a recognized object. Markers are used to identify and retrieve AR objects from a catalog or sub-catalog. AR objects are well known, and each comprises an augmented version of an object that resides in the real world. The AR object is augmented by computer-generated perceptual information. Methods for creating and storing AR objects are well known in the art, and therefore will not be described herein. Any known or to be known technique for creating and storing AR objects can be used herein without limitation.

Figure 2:
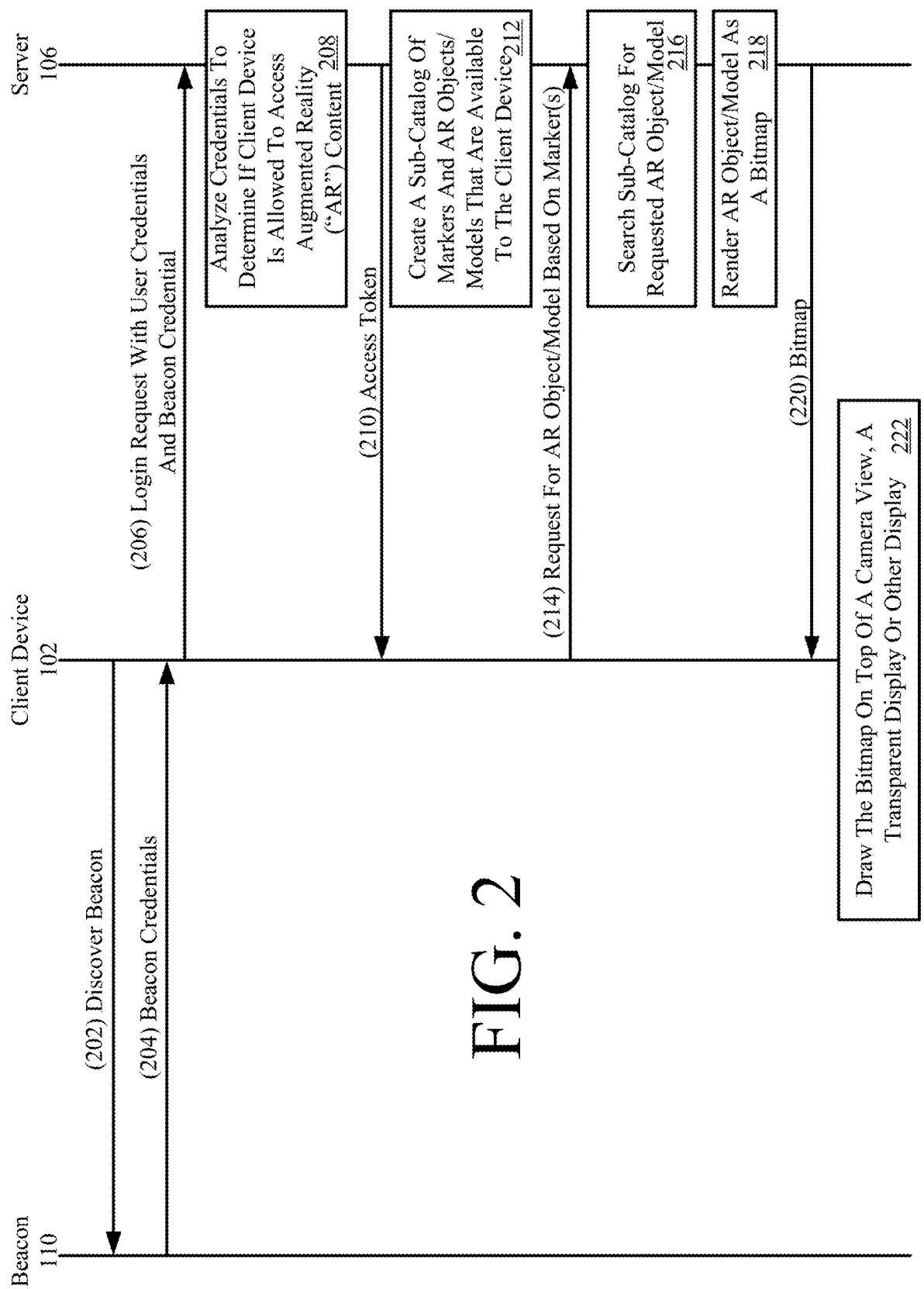
FIG. 2 is a message flow that is useful for understanding operations of the system shown in FIG. 1.

Operations of system 100 will now be discussed in relation to FIG. 2. During operation, the client device 102 discovers a beacon 110 as shown by 202. Beacon 110 facilitates secure sever login for accessing AR content. In this regard, beacon 110 communicates beacon credentials to the client device as shown by 204. The beacon credentials include, but are not limited to, a beacon identifier and/or a beacon location. The credentials for the client device and the credentials for the beacon are then used in 206 to login to the server 106. The client device credentials include, but are not limited to, a device identifier, a user identifier, a code, an entity identifier, a user identifier, an account number and/or a password. The client device and beacon credentials provide contextual information for the user. In 208, the contextual information is analyzed by the server to determine if the client device is allowed access to AR content. This analysis can involve: comparing client credentials to pre-stored client credentials to determine if a match exists therebetween; comparing beacon credentials to pre-stored beacon credentials to determine if a match exists therebetween; denying access to the AR content when results of one or both comparison operations indicates that a match does not exit; and allowing access to AR content when the results of one or both comparison operations indicates that a match does exit. When access to the AR content is allowed, the server 106 provides an access token to the client device 102, as shown by 210.

In 212, the server 106 also creates a sub-catalog of markers and AR objects/models that are available to the client device. This involves: accessing a full catalog of markers and AR objects/models in a datastore 108 (e.g., a database); and filtering markers and AR objects/models from the full catalog based on the contextual information for the user and beacon. The result of the filtering operations is a sub-catalog. The sub-catalog contains only the markers and AR objects that are made available when the circumstances specified by the contextual information exist. This sub-catalog (rather than the full catalog) is searched when requests for AR content from the client device need to be fulfilled.

Upon recognizing a marker or being triggered by a user to show/place an AR object on an anchor point, the client device 102 makes a request for an AR object/model to the server 106, as shown by 214. The request includes the AR object identifier and initial parameters that indicate an initial orientation and scaling of the requested AR object with respect to a camera. Upon receiving such request, the server 106 searches the sub-catalog for the requested AR object/model in 216. The server 106 also starts a rendering engine. The rendering engine loads the AR object associated with the object identifier and initiates a virtual camera. The scope and orientation of the virtual camera is set so that the scale and orientation of the AR object looking through the camera matches the received initial orientation and scaling specified in the request. The rendering engine renders the AR object as a bitmap using the virtual camera, as shown by 218. The rendered bitmap is then sent to the client device 102 in 220. Upon receiving the rendered bitmap, the client device 102 draws the bitmap on top of a camera view, a transparent display or other display in 222, i.e., the bitmap is drawn in a display screen at the location of the anchor point that is being tracked using SLAM. Notably, there may be more than one such anchor point. Each anchor point corresponds to one AR object being rendered and updated on the server 106.

Figure 3:
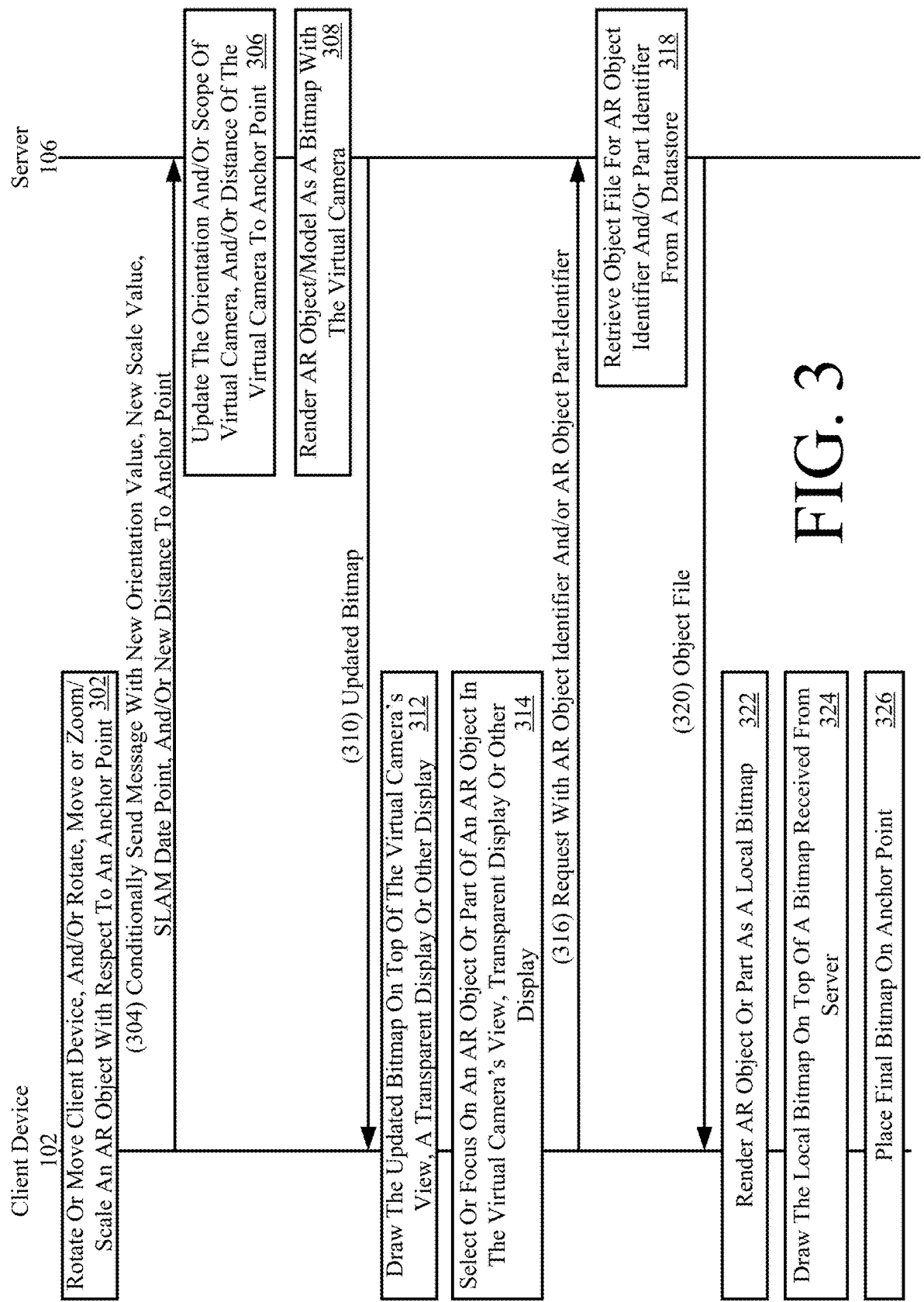
FIG. 3 is a message flow that is useful for understanding operations of the system shown in FIG. 1.

Referring now to FIG. 3, operations of system 100 will be described when (A) the client device 102 is rotated or moved, (B) an AR object is rotated or moved relative to an anchor point, (C) the AR object is zoomed in on, or (D) the AR object's scale is modified. When (A), (B), (C) and/or (D) occurs as shown by 302, a message is conditionally sent from the client device 102 to the server 106 in 304. The message includes a new orientation value, a new scale value, a SLAM data point, a new distance to an anchor point, and/or any other data point related to the client device's operation and/or use. Notably, the client device may not send the message of 304 so that a manual adjustment of an orientation or displacement of the AR object can be made. In this regard, a decision to send the message is based a mode of the AR software application (e.g., a lock mode or an unlock mode).

Upon receiving this information, the server 106 updates the orientation of the virtual camera, the scope of the virtual camera, and/or the distance of the virtual camera to an anchor point accordingly, as shown by 306. The AR object/model is then rendered in 308 as a bitmap using the virtual camera with the updated orientation, scope and/or distance. The updated bitmap is then sent in 310 from the server 106 to the client device 102. Upon receiving the updated bitmap, the client device 102 draws the updated bitmap on top of the camera view, a transparent display or other display as shown by 312, i.e., the bitmap is drawn in a display screen at the location of the anchor point that is being tracked using SLAM.

In 314, the user 112 of the computer device 102 selects or focuses on another AR object or a part of the AR object in the virtual camera's view, transparent display or other display. Upon selecting/focusing by the user 112 on the AR object or part of an AR object, a request 316 is sent to the server 106 with the AR object-identifier and/or AR object part-identifier. Upon receiving this request, the server 106 retrieves the object file in 318 for the AR object or part from the datastore 108.

In 320, the object file is sent to the client device 102. Upon receiving the object file, the client renders the AR object or part of the AR object as a bitmap using a local rendering engine as shown by 322. In 324, the client device 102 then mixes the bitmap for the AR object received from the server 106 with the bitmap generated by the local rendering engine. This mixing is achieved by drawing the local bitmap on top of the bitmap received from server 106 to produce the final bitmap. The final bitmap is then placed on the corresponding anchor point in 326.

Figure 4:
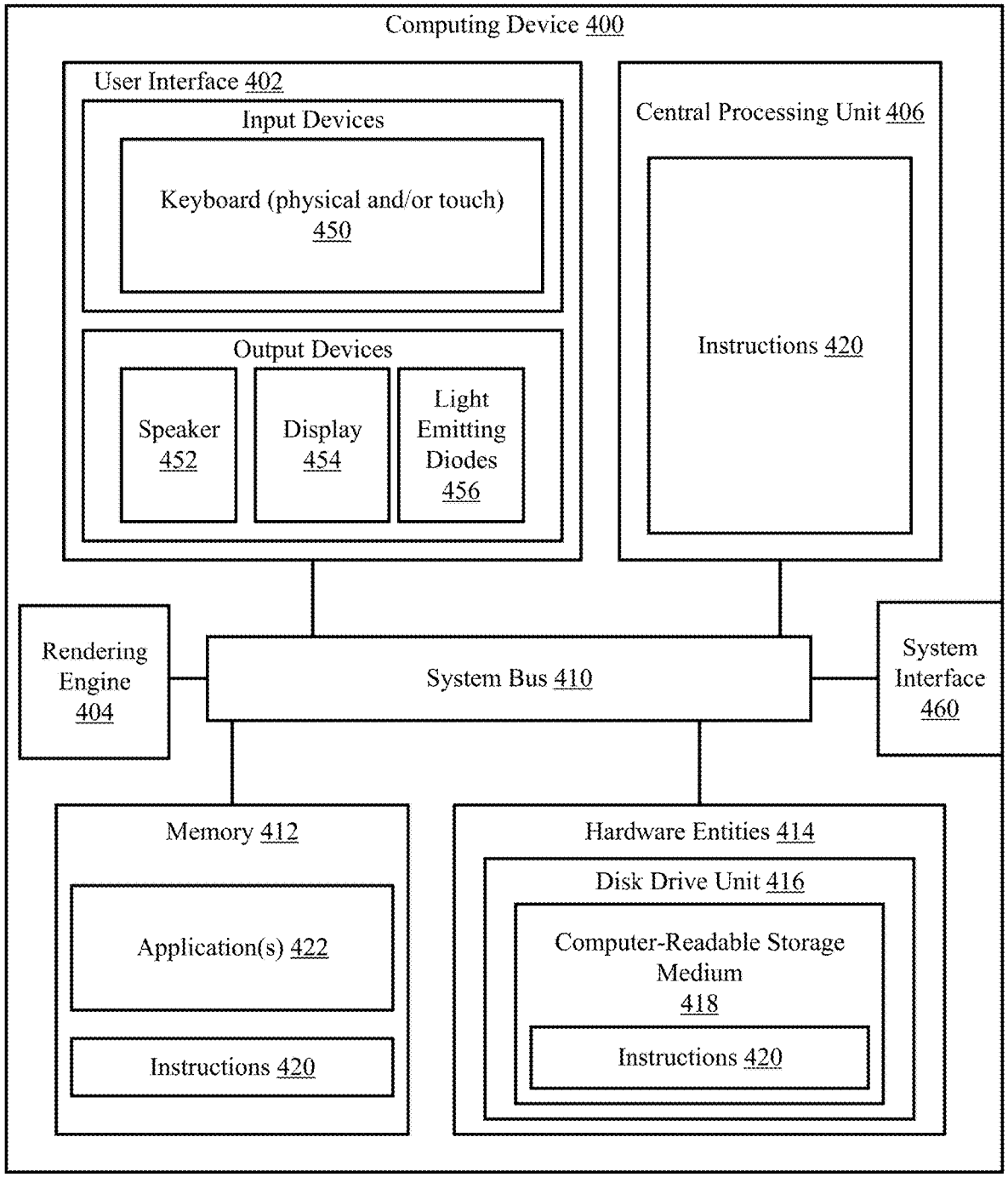
FIG. 4 provides a block diagram of an illustrative architecture for a computing device.

Referring now to FIG. 4, there is provided an illustration of an illustrative architecture for a computing device 400. Client device 102 and/or server 106 of FIG. 1 is(are) the same as or similar to computing device 400. As such, the discussion of computing device 400 is sufficient for understanding this component of system 100.

In some scenarios, the present solution is used in a client-server architecture. Accordingly, the computing device architecture shown in FIG. 3 is sufficient for understanding the particulars of client computing devices and servers.

Computing device 400 may include more or less components than those shown in FIG. 4. However, the components shown are sufficient to disclose an illustrative solution implementing the present solution. The hardware architecture of FIG. 4 represents one implementation of a representative computing device configured to provide improved email attachment viewing, as described herein. As such, the computing device 400 of FIG. 4 implements at least a portion of the method(s) described herein.

Some or all components of the computing device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 comprises a user interface 402, a Central Processing Unit ("CPU") 406, a system bus 410, a memory 412 connected to and accessible by other portions of computing device 400 through system bus 410, a system interface 460, and hardware entities 414 connected to system bus 410. The user interface can include input devices and output devices, which facilitate user-software interactions for controlling operations of the computing device 400. The input devices include, but are not limited, a physical and/or touch keyboard 450. The input devices can be connected to the computing device via a wired or wireless connection (e.g., a Bluetooth® connection). The output devices include, but are not limited to, a speaker 452, a display 454, and/or light emitting diodes 456. System interface 460 is configured to facilitate wired or wireless communications to and from external devices (e.g., network nodes such as access points, etc.).

At least some of the hardware entities 414 perform actions involving access to and use of memory 412, which can be a Random Access Memory ("RAM"), a disk driver and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Computing device 400 may also comprise a rendering engine 404. The rendering engine 404 is configured to render bitmaps for AR objects using a virtual camera. The rendered bitmaps are communicated to external devices (e.g., client device 102 of FIG. 1) via system interface 460.

Figure 5:
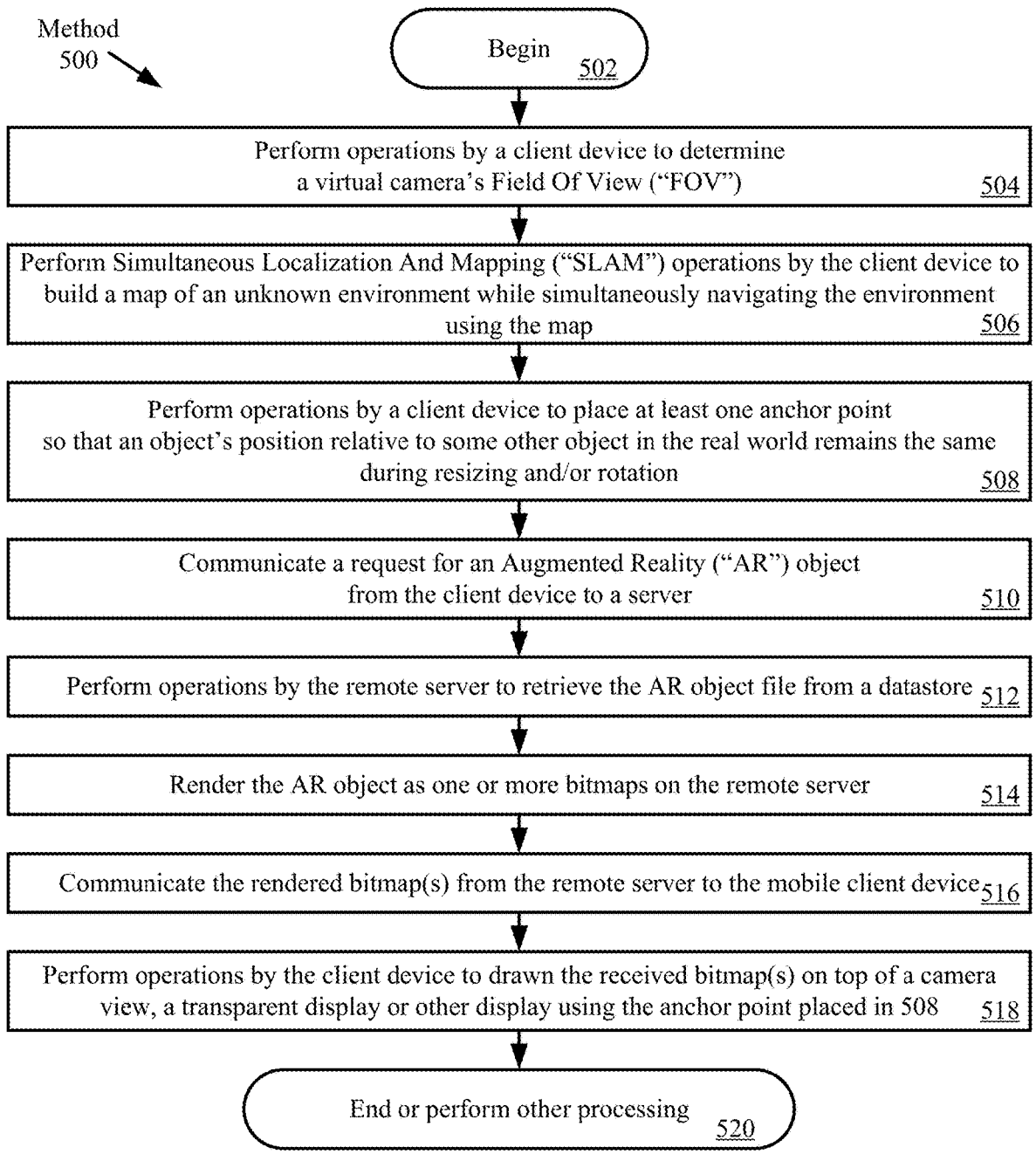
FIG. 5 provides a flow diagram of an illustrative method for AR object rendering in a virtualized environment.

Referring now to FIG. 5, there is provided a flow diagram of an illustrative method 500 for AR object rendering in a virtualized environment. Method 500 begins with 502 and continues with 504 where a client device (e.g., client device 102 of FIG. 1) (which may be roaming or otherwise moving) performs operations to determine a virtual camera's FOV. In 506, SLAM operations are performed by the client device to build a map of an unknown environment while simultaneously navigating the environment using the map. The client device then performs operations in 508 to place at least one anchor point so that an object's position relative to some other object in the real world remains the same during resizing and/or rotation. Next in 510, a request for an AR object is sent from the client device to the server.

In response to the request, the server retrieves the AR object from a datastore (e.g., datastore 108 of FIG. 1), as shown by 512. The AR object is then rendered in 514 by a rendering engine (e.g., rendering engine 404 of FIG. 4) of the server as one or more bitmaps. The rendered bitmap(s) is(are) communicated from the server to the client device in 516. At the client device, the received bitmap(s) is(are) drawn on top of a camera view, a transparent display or other display using the anchor point placed in 508, as shown by 518. Subsequently, 520 is performed where method 500 ends or other processing is performed (e.g., return to 504).

Figure 6:
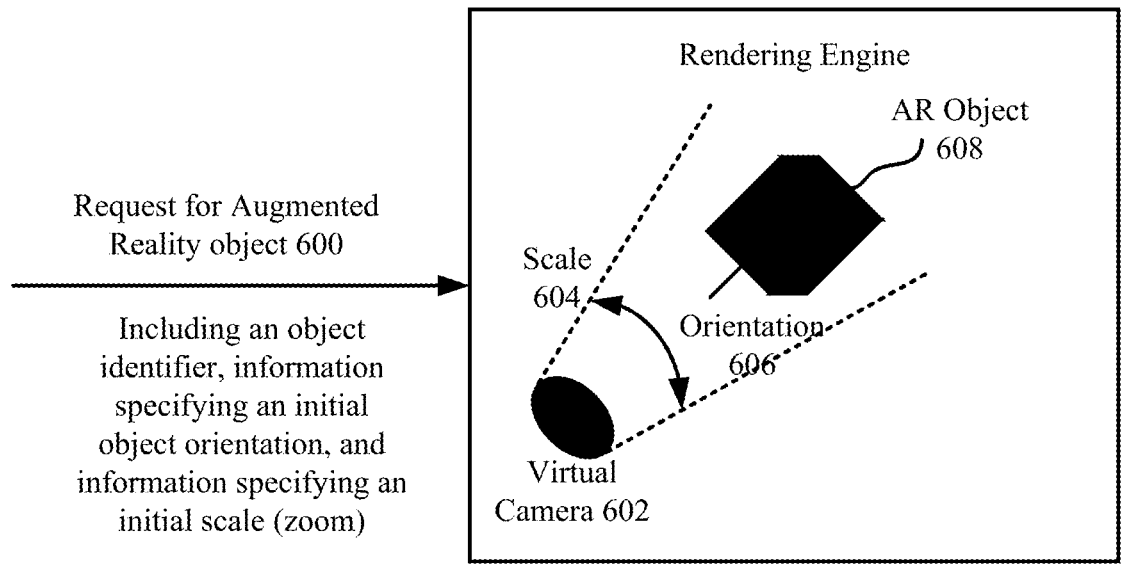
FIGS. 6-7 provide illustrations that are useful for understanding an AR object rendering in accordance with the present solution.

FIG. 6 shows an illustration that is useful for understanding operations of a rendering engine (e.g., rendering engine 404 of FIG. 4). In response to a request for an AR object 600, the rendering engine generates a bitmap representing an AR object 608 when a virtual camera 602 has a given orientation 606 and scale 604.

Figure 7:
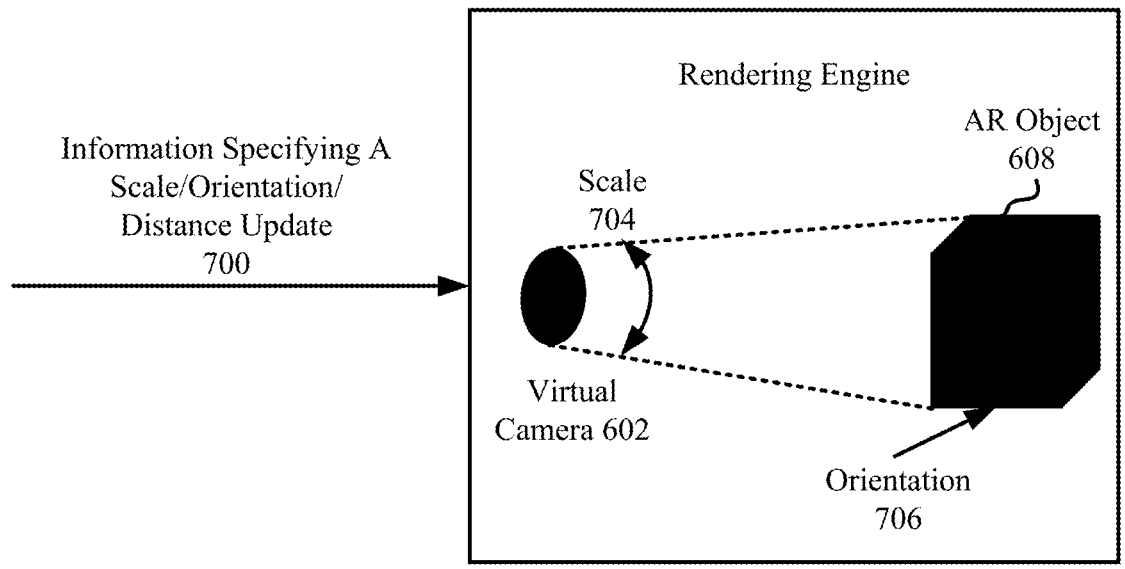

FIG. 7 shows an illustration that is also useful for understanding operations of a rendering engine (e.g., rendering engine 404 of FIG. 4). In response to the rendering engines reception of update information 700, the rendering engine generates one or more updated bitmap(s) representing the AR object 608 when the virtual camera 602 has an updated scale 704, an updated orientation 706, and/or an updated distance from an anchor point.

Figure 8:
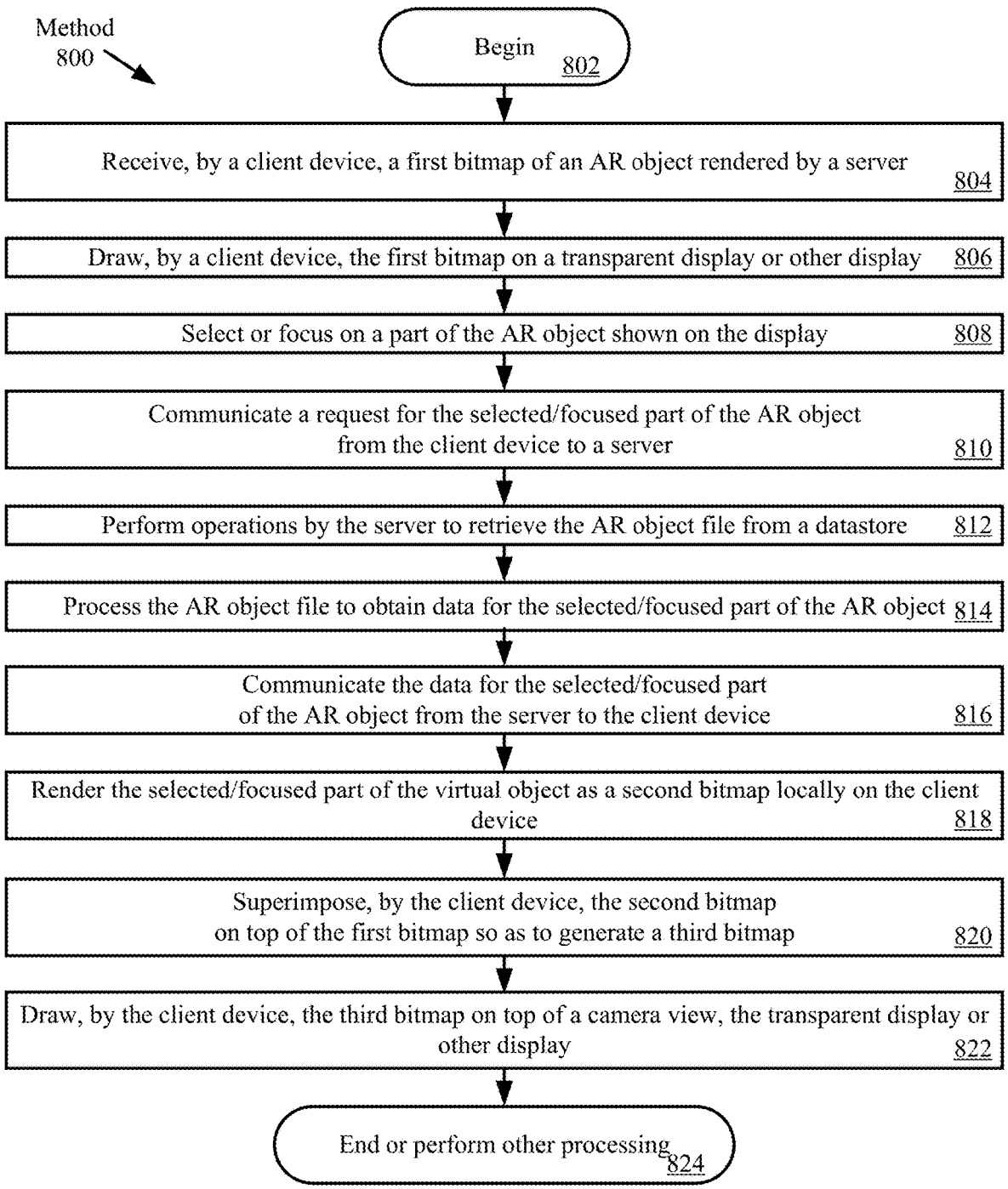
FIG. 8 is a flow diagram of an illustrative method for AR object rendering in a virtualized environment.

Referring now to FIG. 8, there is provided a flow diagram of an illustrative method 800 for AR object rendering in a virtualized environment. Method 800 begins with 802 and continues with 804 where a client device (e.g., client device 102 of FIG. 1) (which may be roaming or otherwise moving) receives a first bitmap of an AR object rendered by a server (e.g., server 106 of FIG. 1). In 806, the client device draws the first bitmap on a transparent display or other display. Operations are then performed in 808 to select or focus on a part of the AR object shown on the display. A request for the selected/focused part of the AR object is then communicated from the client device to a server in 810. In response to the request, the server retrieves an AR object file from a datastore (e.g., datastore 108 of FIG. 1), as shown by 812. The server then processes the AR object file in 814 to obtain data for the selected/focused part of the AR object. In 816, data for the selected/focused part of the AR object is communicated from the server to the client device. The selected/focused part of the AR object is rendered as a second bitmap locally on the client device, as shown by 818. In 820, the second bitmap is superimposed on top of the first bitmap so as to generate a third bitmap. The third bit map is then drawn by the client device in 822 on top of a camera view, a transparent display or other display. Subsequently, method 800 ends or other processing is performed.

The above-described solution can be used in many applications. The present solution can be used to stream dynamic AR animations instead of having the AR model animating locally. For example, AR animations are played upon seeing the hardware (or recognizing a product bar code) to show where and how to put some component.

The present solution may also be used for sharing an AR environment having both static and dynamic AR objects with another user. Dynamic objects may best be streamed directly from the server while static AR objects can be rendered locally for high fidelity and fluid experience.

The present solution may further be used to selectively render certain parts of or a whole AR object depending upon user and location contexts. For example, a company while designing a new product may want certain employees to have access to some of the parts of the new product design available through AR while restricting some of the confidential parts depending on the employee authorization.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for rendering an Augmented Reality ("AR") object, comprising:
   drawing a first bitmap of a first AR object rendered by a server on a display of a client device;
   selecting or focusing on a second AR object or a part of the first AR object shown on the display of the client device;
   communicating a request for the second AR object or the part of the first AR object from the client device to the server;
   obtaining, by the server, an object file for the second AR object or part of the first AR object;
   providing the object file to the client device;
   rendering, by the client device, the second AR object or part of the first AR object as a second bitmap using a local rendering engine;
   superimposing the second bitmap on the first bitmap to generate a third bitmap; and
   drawing the third bitmap on the display of the client device.

2. The method according to claim 1, further comprising performing operations by the client device to discover a beacon, obtain credentials from the beacon, and use the beacon's credential to login to the server for accessing AR content.

3. The method according to claim 2, wherein credentials for at least one of the client device and a user are also used to login to the server.

4. The method according to claim 1, further comprising performing operations by the server to generate a sub-catalog of markers and AR objects based on certain criteria when the client device logs in.

5. The method according to claim 4, wherein the certain criteria comprises a time, a user identifier, a location, an internet connection type, a device type, manually entered filter criteria, or other contextual information relating to the client device's operation or use.

6. The method according to claim 4, further comprising:
   searching the sub-catalog for the first AR object;
   rendering the first AR object as the first bitmap remotely at the server; and
   providing the first bitmap to the client device.

7. The method according to claim 1, further comprising:
   detecting at least one of (A) rotation, change in orientation, or movement of the client device and (B) rotation, movement, a change in scale, or a change in a zoom level associated with the first AR object;
   sending to the server a message with at least one of a new orientation value, a new scale value, a Simultaneous Localization And Mapping ("SLAM") data point, a new distance for a camera to an anchor point, a data point related to the client device's operation or use, and a new distance of the client device to an anchor point;
   updating at least one of an orientation of a virtual camera or a distance of the virtual camera to the anchor point based on contents of the message;
   rendering by the server the first AR object as an updated first bitmap with the virtual camera; and
   sending the updated first bitmap to the client device.

8. The method according to claim 7, further comprising:
   re-rendering, locally by the client device, the second AR object or part of the first AR object as the second bitmap based on at least one of (A) a rotation, a change in orientation, or movement of the client device and (B)

a rotation, a movement, a change in zoom level or a change in scale of the first AR object;
superimposing the second bitmap on the first bitmap to update the third bitmap; and
drawing the third bitmap on the display of the client device.

9. The method according to claim 7, further comprising drawing the updated bitmap on a display of a client device.

10. The method according to claim 1, further comprising limiting which parts of the first AR object may be rendered based on at least one of who is using the client device and the client device's location.

11. A system, comprising:
a processor; and
a non-transitory computer-readable storage medium comprising programming instructions that are configured to cause the processor to implement a method for rendering an Augmented Reality ("AR") object, wherein the programming instructions comprise instructions to:
draw a first bitmap of a first AR object rendered by a server on a display;
select or focus on a second AR object or a part of the first AR object shown on the display;
communicate a request for the second AR object or the part of the first AR object to the server;
receive, from the server, an object file for the second AR object or part of the first AR object;
locally render the second AR object or part of the first AR object as a second bitmap;
superimpose the second bitmap on the first bitmap to generate a third bitmap; and
draw the third bitmap on the display.

12. The system according to claim 11, wherein the programming instructions comprise instructions to discover a beacon, obtain credentials from the beacon, and use the beacon's credential to login to the server for accessing AR content.

13. The system according to claim 12, wherein credentials for at least one of the client device and a user are also used to login to the server.

14. The system according to claim 12, wherein a sub-catalog of markers and AR objects is generated based on certain criteria when the login occurs.

15. The system according to claim 14, wherein the certain criteria comprises a time, a user identifier, a location, an internet connection type, a device type, manually entered filter criteria, or other contextual information relating to the client device's operation or use.

16. The system according to claim 14, wherein the sub-catalog is searched for the first AR object, and the first AR object is rendered as the first bitmap remotely at the server.

17. The system according to claim 11, wherein the programming instructions comprise instructions to:
detect at least one of (A) rotation, change in orientation, or movement of a client device and (B) rotation, movement, change in scale or a change in a zoom level associated with the first AR object;
send to the server a message with at least one of a new orientation value, a new scale value, a Simultaneous Localization And Mapping ("SLAM") data point, a new distance for a camera to an anchor point, a data point related to the client device's operation or use, and a new distance of the client device to an anchor point;
receive an updated first bitmap for the first AR object, where the updated first bitmap was rendered with a virtual camera having at least one of an updated orientation and an updated distance to the anchor point.

18. The system according to claim 17, wherein the programming instructions further comprise instructions to draw the updated bitmap on the display.

19. The system according to claim 11, wherein the programming instructions further comprise instructions to limit which parts of the first AR object may be rendered based on at least one of who is using the client device and the client device's location.

20. A method for rendering an Augmented Reality ("AR") object, comprising:
drawing, by a client device, a bitmap for the AR object received from a server on a display;
detecting when (A) the client device is rotated or moved, (B) the AR object is rotated or moved relative to an anchor point, (C) the AR object is zoomed in on, or (D) the AR object's scale is modified;
in response to a detection of at least one of (A), (B), (C) and (D), communicating a message from the client device to the server, where the message comprises at least one of a new orientation value, a new scale value, a Simultaneous Localization And Mapping ("SLAM") data point, a new distance of a camera to an anchor point, and a data point related to the client device's operation or use;
updating, by the server, at least one of an orientation of a virtual camera, a scope of the virtual camera, and a distance of the virtual camera to an anchor point in accordance with contents of the message;
rendering, by the server, the AR object as a bitmap using the virtual camera with the updated orientation, scope or distance;
drawing, by the client device, the bitmap on the display.

21. The method according to claim 20, further comprising performing operations by the client device to discover a beacon, obtain credentials from the beacon, and use the beacon's credential to login to the server for accessing AR content.

22. The method according to claim 21, wherein credentials for at least one of the client device and a user are also used to login to the server.

23. The method according to claim 20, further comprising performing operations by the server to generate a sub-catalog of markers and AR objects based on certain criteria when the client device logs in.

24. The method according to claim 23, wherein the certain criteria comprises a time, a user identifier, a location, an internet connection type, a device type, manually entered filter criteria, or other contextual information relating to the client device's operation or use.

25. The method according to claim 23, further comprising:
searching the sub-catalog for the first AR object;
rendering the first AR object as the first bitmap remotely at the server; and
providing the first bitmap to the client device.

26. The method according to claim 20, further comprising limiting which parts of the first AR object may be rendered based on at least one of who is using the client device and the client device's location.

* * * * *